Jan. 3, 1933.  M. C. SMITH  1,893,451
FLOC TREATMENT
Filed March 16, 1932   2 Sheets-Sheet 1
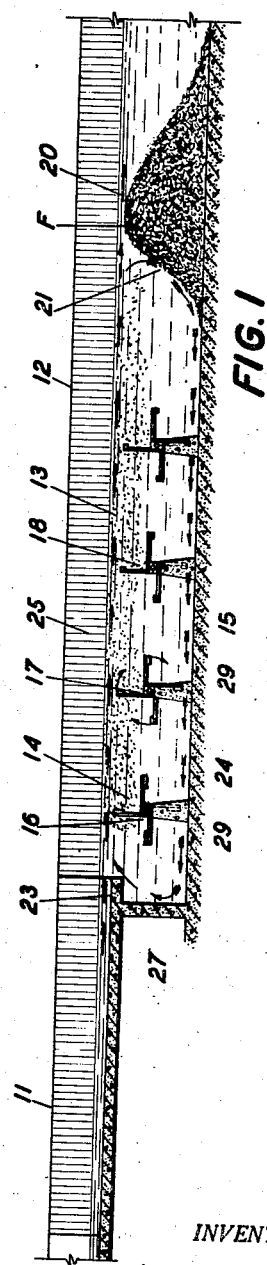
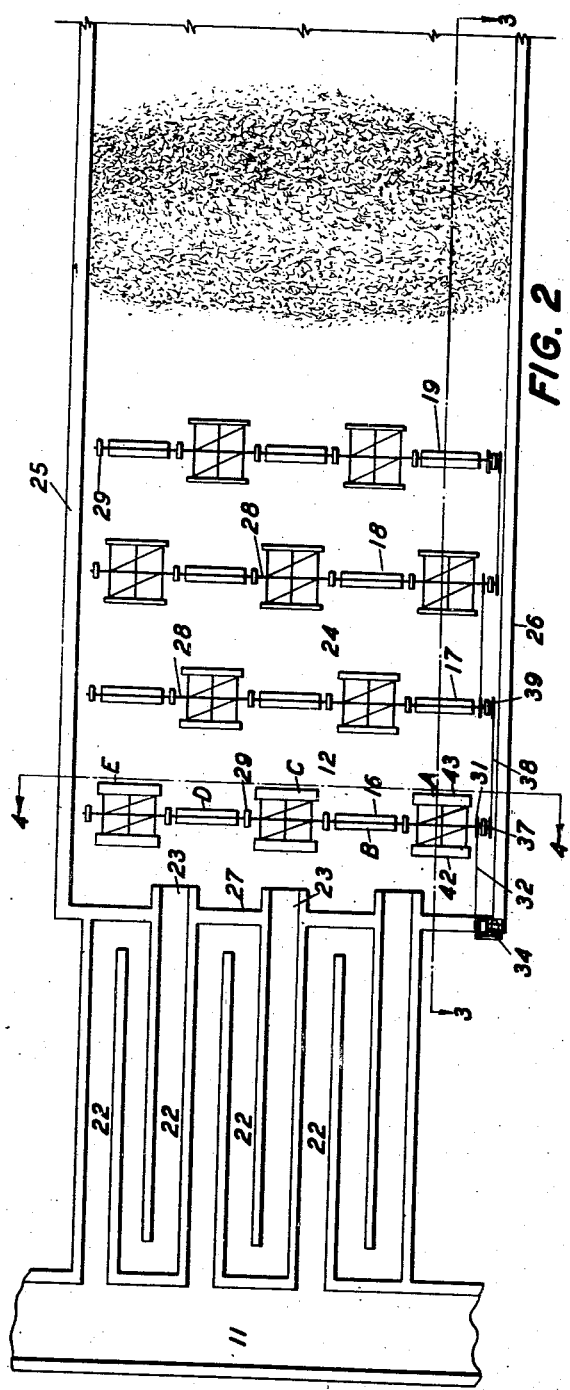
INVENTOR.
M. C. SMITH
BY
ATTORNEY Jan. 3, 1933.                M. C. SMITH                 1,893,451
                             FLOC TREATMENT
                         Filed March 16, 1932        2 Sheets-Sheet  2
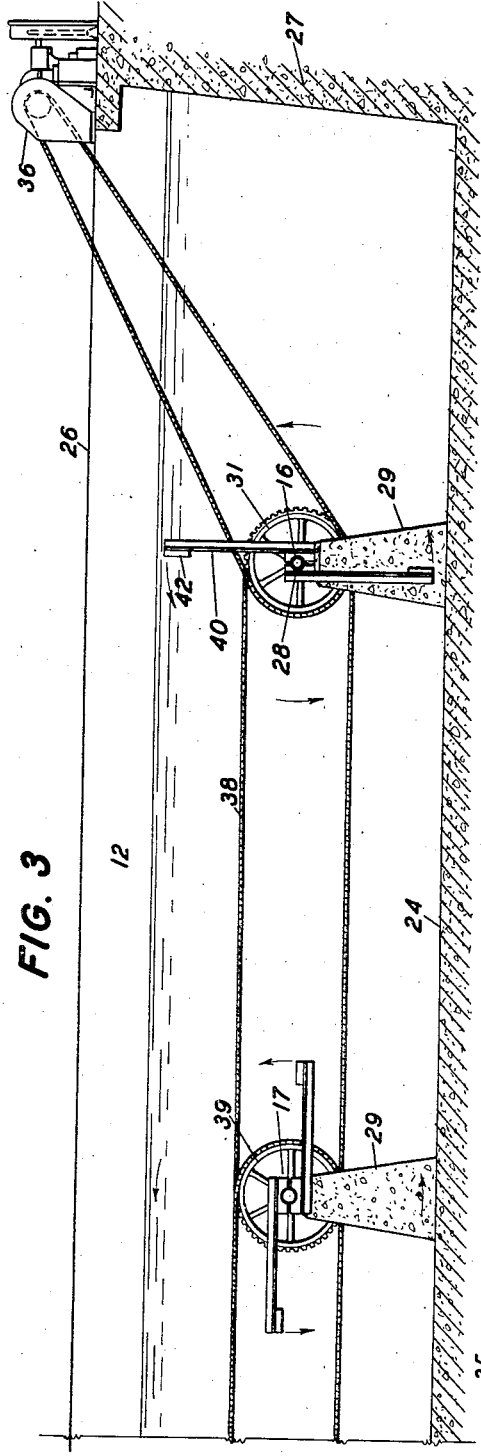
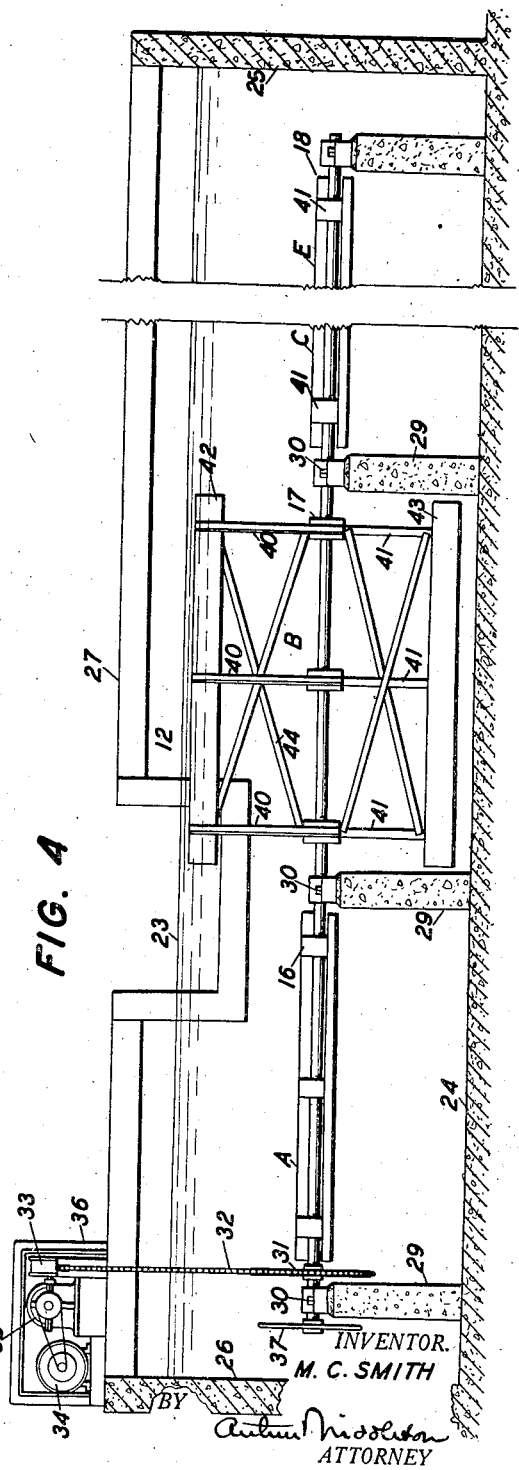
INVENTOR.
M. C. SMITH
BY
ATTORNEY Patented Jan. 3, 1933

1,893,451

UNITED STATES PATENT OFFICE

MARSDEN C. SMITH, OF RICHMOND, VIRGINIA

FLOC TREATMENT

Application filed March 16, 1932. Serial No. 599,164.

This invention relates to the clarification or purification of liquids, such as water, trade wastes or the like, having solids in suspension therein, wherein flocculation comprises one step in the purification treatment thereof.

The object of the invention is to so treat flocs after they are formed or coagulated in the liquid to be treated, that they will quickly settle. A further object is to so treat the flocs that in settling they will carry down with them other solids or impurities in the liquid. And a still further object is to devise apparatus which will carry out said treatments.

The nature of the invention resides in continuously circulating within a body of the liquid to be treated which contains partially formed flocs, previously formed flocs to thoroughly mix them with the newer flocs. The invention also resides in maintaining within the liquid to be treated, a zone of turbidity, and in causing flocs to repeatedly traverse or pass through said zone. By circulating and intermingling previously formed flocs with newly formed flocs and repeatedly causing this mixture of flocs to pass through a zone of turbidity in the liquid, flocs of maximum size are produced and these flocs pick up other impurities in the liquid.

These enlarged flocs tend to settle rapidly and in settling they carry down with them the other impurities present in suspension in the liquid so that the whole liquid is clarified or purified. This result has been previously much desired, but not attained.

The invention also contemplates maintaining in the liquid adjacent to the zone of flocculation, a supply or reservoir of settled flocs which can be automatically and continuously drawn upon for the recirculation of these previously formed flocs into and through the liquid to be treated.

It has been found that the preliminary treatment of solids in suspension to coagulate them or to flocculate them is not nearly so important as has been generally believed, so this invention resides in the manner of treating the flocs after they have been at least partially formed.

The invention also resides in an apparatus for carrying out the above described floc treatment which consists essentially in providing a supply of previously formed flocs and liquid-current-producing means having the combined function of maintaining a zone of concentrated turbidity in the liquid and of circulating and mingling the previously and newly formed flocs through the zone of concentrated turbidity. This step of flocculation coupled with impelling flocs through a maintained zone of concentrated turbidity is followed by the step of sedimentation.

More particularly, the invention may be said to involve causing a stream of liquid holding newly formed flocs in suspension and forming a zone of concentrated turbidity to flow in one direction and then causing another stream of liquid holding previously formed flocs to flow in juxtaposition thereto but oppositely directed therefrom whereby the two streams run countercurrently. The oppositely directed contacting streams set up eddies which have the combined function of mixing and mingling the various flocs with each other and of impelling this mixture of flocs to repeatedly traverse the zone of turbidity.

These two oppositely directed streams are preferably set up within the body of liquid to be purified and within a single container. In this case, the course of each stream is in one part thereof flowing outwardly, it turns, flows backwardly, turns again, and once more flows outwardly. Some of the outwardly flowing stream flows to discharge and to further treatment by sedimentation.

Another feature of the invention is creation and maintenance of an ample supply of previously formed and sedimented flocs suitably arranged and located so that the backflowing stream will pick up and sweep along with it some of the previously formed flocs from said supply.

Further objects are also contemplated as can be seen from the following description and the combination and relation of parts as shown.

The manner of carrying out this invention can be better understood from the accompanying drawings in which diagrams and a preferred embodiment of the invention are shown for illustrative purposes. In these drawings, Figure 1 shows a more or less diagrammatic indication of an elevation of a device embodying the invention. Figure 2 shows a plan view of the device of Figure 1. Figure 3 shows a longitudinal sectional view of a part of the device, while Figure 4 shows a transverse sectional view thereof.

In the carrying out of the invention, the liquid to be flocculated and purified is dosed with some coagulant such as alum, as is usual. From the dosing tank 11, wherein the flocs are formed, the liquid with flocs in suspension therein is led to the floc treating basin or channel 12 where the floc treatment of this invention takes place.

It is in this channel 12 that the liquid to be treated is circulated so that a zone of finest turbidity or of concentrated turbidity 13, is created and maintained, preferably in the upper portion 14 of the liquid in the tank or channel 12.

The zone of concentrated turbidity is produced by setting up within the channel 12 two juxtaposed streams of liquid 14 and 15 preferably superposed, flowing generally in opposite directions. These streams receive their impulse from any appropriate current impellers, which, in the drawings are shown as bladed paddle wheels 16, 17, 18 and 19 all turning in the same direction.

Liquid to be purified is coagulated in the mixing or dosing chamber 11 wherein flocs begin to form in the liquid, and then the liquid with its newly formed flocs is flowed into the purification channel 12. Here the liquid, with its flocs, encounters the outwardly flowing stream 14 and traverses the zone of concentrated turbidity 13. A part of the flocculated liquid flows to discharge 20 and its flocs settle from it by sedimentation into a pile or stack F of separated flocs and sludge. Some of the outwardly flowing stream 14 is turned to reverse its direction to become the backflowing stream 15.

In changing its direction, the stream curves along the front face 21 of the stack 20 of sedimented flocs picking up some of those flocs which are swept along by the stream 15 to the front end of the channel 12 where the backflowing stream 15 has its direction changed and it becomes outflowing stream 14. It is at this point of change of direction that the flocs being swept along by the backflowing stream 15 are mixed and mingling with the newly formed flocs issuing from the dosing chamber 11.

The backflowing stream serves a double purpose. The first is to convey and circulate previously formed flocs (indicated by feathered arrows) into the newly formed flocs (indicated by unfeathered arrows) emitted from the dosing chamber 11, in a manner which has no tearing or distintegrating action on the old flocs. That is, they are thus recirculated without encountering any molesting or disturbing influences. The second purpose of the backflowing stream is to create and maintain the zone of turbidity 13 in the upper part of the channel 12 and in the outflowing stream 14.

This latter is accomplished by the following action: The solids in suspension which produce turbidity tend to settle but in settling they encounter the backflowing stream 15 which quickly carries any solids engaged thereby back up into the outflowing stream 14 whereupon these solids are promptly returned to the zone of turbidity 13. This return is an automatic and continuous process so there is no difficulty in thus maintaining the zone of turbidity in place and in a concentrated form.

The mixing or mingling of the recirculated old flocs with the newly formed flocs has a mutually stimulating effect to produce ultimate flocs of maximum size. The maximum sized flocs have a tendency to settle but this tendency is overcome as they encounter the uprising blades on a plurality of paddle wheels 16, 17, 18 and 19 so they are given an upward impetus. This falling and rising of the flocs meanwhile being carried along by the outflowing stream 14, produces the important result aimed at in this invention of causing the flocs to repeatedly traverse the zone 13 of concentrated turbidity, or to zigzag across it in a substantially vertical direction.

In repeatedly traversing the zone of turbidity, the flocs come into contact with or into collision with a maximum number of the non-flocculatable solids in suspension (which cause the turbidity). And it is these collisions which enable the flocs to pick up and cause the suspended solids to adhere thereto. The flocs, due partly to their maximum size and partly to the weight of their adsorbed solids, thus have their settleability increased so they quickly settle onto the stack F in the form of sedimented sludge.

The settled sludge F can be removed by any suitable means. The mechanism for producing the juxtaposed streams of flowing liquid is capable of many embodiments but one embodiment which has been found to produce efficient results is shown in the accompanying drawings.

In Figures 1 and 2 the liquid to be purified is treated with some coagulating agent in the dosing tank or compartment 11 and is caused to flow through circuitous channels 22 to produce a more thorough mixing of the water with the coagulant. The dosed water or liquid is emitted from the dosing chamber 11 by means of spouts 23 into the channel or basin 12 where the purification steps of this invention are applied. The basin 12 is provided with a bottom 24 and side walls 25 and 26 and an end wall 27. The outlet end of the basin 12 is not shown.

The means for setting up the oppositely directed streams of liquid in the basin 12 may be of a variety of constructions but the construction which has been found effective comprises a plurality of paddle mechanisms or groups of paddles 16, 17, 18 and 19 extending transversely of the basin 12. While only three such groups of paddles have been shown, two or more groups may be used as are found desirable based upon different conditions encountered in different places.

Describing the paddle group 16 as being representative in construction of the other groups, it will be noted that a shaft 28 extends transversely of the basin 12 and is supported on standards 29 rising from the bottom 24 of the basin. Each standard is provided with a suitable bearing 30 for supporting the shaft 28 in position for rotation. The shaft is provided with a sprocket 31 motivated by chain or other suitable drive 32 taking around another sprocket 33 driven from some prime mover such as a motor 34 through the medium of a speed reducer 35. The motor and the speed reducer may be properly housed by a casing 36 to protect them from the weather. The motor and its drive is preferably supported from one wall of the chamber such as 27. The shaft 28 of the paddle group 16 is also provided with a further sprocket 37 around which takes a chain 38 to drive a sprocket 39 on shaft 28 of the next adjacent paddle group 17. In this manner one motor can be used to drive one paddle group; that paddle group used to drive the next adjacent paddle group; and so on, since all of the paddles operate in the same direction and in a clockwise manner.

The shaft 28 of the paddle group 16 is provided with a plurality of oppositely directed arms 40 and 41 which are used for the support of paddle blades 42 and 43 respectively. The paddle blades 42 and 43 are spaced apart substantially 180°.

The paddle group 16 is made up of a plurality of current impelling or paddle units, of which one has just been described. Each paddle unit has been indicated as A, B, C, D and E. These paddle units are all of the same construction but the paddles of each one is positioned 90° apart from the paddles of its next adjacent neighbor. This arrangement is clearly shown in Figure 2 of the drawings and Figure 4. Each paddle unit is provided with diagonal extended strips or battens 44 in order to more thoroughly mix the liquid on which the paddles act.

The paddle groups 16, 17, 18 and 19 are all alike in construction except that the angular extension of the blade is staggered as shown in the drawings and the blades of the group 17 are slightly less in width than the blades in the group 16. Similarly, the blades in the group 18 are less in width than the blades in the group 17. And again, the blades in group 19 are less in width than those in group 18.

It has been found that the liquid to be treated requires progressively less agitation as it is flowed through the basin 12 but rather than operate the successive paddle groups at progressively lessened speeds, it is preferred to operate all the groups at the same speed to lessen the amount of agitation produced by successive groups by using narrower paddle blades.

A very important feature in the arrangement of apparatus for carrying out this invention is that the spouts 23 should be on a level with or above the horizontal plane of the shafts 28 of the paddle groups. If the level of the inflowing liquid from the dosing chamber 11 is lower than the plane of the paddle shafts, it will interfere with the formation of the oppositely directed streams 14 and 15. On the other hand, if the level of the spouts 23 and the liquid issuing therefrom is kept above the level of the paddle shafts, it tends to stimulate the velocity of the outflowing stream 14.

It is desirable that the paddle groups be so spaced that no accumulation of settled solids or sludge will take place on the floor 24 of the basin 12 between adjacent paddle groups. It is important that no sludge or other deposit interfere with the uninterrupted backflowing stream 15 along the bottom of the basin.

It will thus be seen that this invention involves a simple but effective process and apparatus whereby liquids can be purified by means of mingling previously formed with newly formed flocs in a manner whereby the flocs are not disintegrated; and in repeatedly impelling the mixture of flocs in a zigzag manner through a zone of turbidity wherein the finest particles of turbidity are concentrated.

The mixed and enlarged flocs pick up the particles of turbidity and settle in the form of sedimented sludge on the floor of the basin 12. This sludge can then be removed from the floor intermittently as desired. The invention is broad enough to be carried out in many other kinds of mechanisms than those shown herein and the principles of the invention can be used in the treatment of any liquids that are to be flocculated or purified.

I claim:

1. The method of liquid purification which comprises adding a coagulant to a liquid to produce flocs therein, agitating a body of the liquid to maintain said flocs in suspension, and substantially horizontally countercurrently and unobstructedly circulating through said liquid a supply of previously formed flocs.

2. The process of liquid purification which comprises forming new flocs in a body of substantially horizontally flowing liquid, maintaining a supply of previously formed flocs, in the body of the liquid, countercurrently and unobstructedly circulating some of said old flocs through said liquid whereby combined flocs are formed, and then settling said combined flocs by sedimentation.

3. A process of liquid purification which includes the steps of forming new flocs in a body of flowing liquid by coagulation, maintaining a supply of previously formed flocs in said body, continuously and unobstructedly sweeping by a substantially horizontally liquid current old flocs from said supply into said body of liquid containing said new flocs.

4. The method of liquid purification which comprises maintaining a zone of concentrated turbidity in one of two juxtaposed unobstructed and contacting oppositely directed streams of liquid to be purified, and then passing flocs through said zone on their way to sedimentation.

5. The method of liquid flocculation comprising producing and maintaining a zone of concentrated turbidity in the body of the liquid to be treated by circulating a quantity of the liquid successively through a plurality of planes by means of oppositely directed superposed substantially horizontal liquid streams whereby solids settling from the upper stream are caught by the lower oppositely directed stream and swept thereby during its circulation into the upper stream whereby the solids are concentrated in the upper stream, and then settling the solids by sedimentation.

6. Apparatus for liquid purification comprising a basin for liquid, a feed therefor of liquid having newly formed flocs in suspension, a supply in said basin of previously formed sedimented flocs, current producing devices within said basin for sweeping said sedimented old flocs into the newly formed flocs in said liquid, and a relatively quiescent zone wherein the resulting flocs settle by sedimentation.

7. Apparatus according to claim 6 in which the current producing devices are bladed.

8. Apparatus for liquid purification comprising a basin, a feed therefor of liquid having newly formed flocs produced therein by coagulation, a supply of previously formed flocs in said basin, bladed means for setting up simultaneously in said tank a current of said liquid having newly formed flocs and an oppositely directed current of previously formed flocs, and sedimentation means for settling the resulting flocs.

9. Apparatus for liquid purification comprising a basin, a liquid feed therefor at one end thereof, a plurality of substantially submerged paddles successively located in said basin operating about centers for producing a liquid current in said basin in one direction above said centers and another liquid current in said basin in an opposite direction below said centers, and a stack of flocs out of reach of said paddles adapted to be swept by one of said liquid currents and distributed throughout said basin.

10. Apparatus for liquid purification comprising a basin for liquid, a feed therefor of liquid having newly formed flocs in suspension, a relatively quiescent zone associated with said basin wherein flocs settle by sedimentation, and means entirely within said basin for unobstructedly mingling flocs settled by sedimentation with newly formed flocs comprising current producing paddles having horizontal axes.

11. Apparatus for liquid purification comprising a horizontal basin for liquid, a horizontal feed therefor of liquid having newly formed flocs in suspension, a relatively quiescent zone associated with said basin wherein flocs settle by sedimentation, and means entirely within said basin for unobstructedly mingling flocs settled by sedimentation with newly formed flocs, said quiescent zone extending horizontally beyond the location of said means.

In testimony whereof I have affixed my signature to this specification.

MARSDEN C. SMITH.